United States Patent [19]
Nakagaki

[11] Patent Number: 5,157,872
[45] Date of Patent: Oct. 27, 1992

[54] CONTROL APPARATUS FOR GRINDING MACHINE

[75] Inventor: Toshio Nakagaki, Kobe, Japan

[73] Assignee: Bando Kagaku Kbushiki Kaisha, Japan

[21] Appl. No.: 619,100

[22] Filed: Nov. 28, 1990

[51] Int. Cl.$^5$ .............................................. B24B 49/16
[52] U.S. Cl. ............................ 51/165.89; 51/165.79; 51/145 R; 51/328
[58] Field of Search ........... 51/165.79, 165.77, 145 R, 51/139, 137, 34 K, 39, 328, 165.89

[56] References Cited

U.S. PATENT DOCUMENTS

| | | | |
|---|---|---|---|
| 2,003,883 | 6/1935 | Grundstein | 51/165.89 |
| 2,924,915 | 2/1960 | Rudnicki | 51/165.89 |
| 3,965,621 | 6/1976 | Grieb et al. | 51/165.77 |
| 4,067,148 | 1/1978 | Kikuchi | 51/165.79 |
| 4,137,677 | 2/1979 | Nedreski | 51/165.77 |
| 4,499,693 | 2/1985 | Fatula, Sr. et al. | 51/145 |
| 4,941,294 | 7/1990 | Nakagaki | 51/328 |

FOREIGN PATENT DOCUMENTS 0202769 11/1983 Japan ................................ 51/165.77

*Primary Examiner*—Robert A. Rose
*Attorney, Agent, or Firm*—Marshall, O'Toole, Gerstein, Murray & Bicknell

[57] ABSTRACT

A control apparatus for controlling the amount of grinding of a belt material in a grinding machine wherein, for example, in the production process of making belts, a cylindrical belt material is ground on its back to finish its thickness to a standard dimension. The controlling apparatus is provided with a feed apparatus for feeding either the grinding member or the work to be ground to force it into contact with the other, a cam apparatus for regulating the feed stepwise up to the preset maximum feed position, and a thickness presetting means for presetting the final thickness of the work to be ground in the maximum feed position of the grinding member controlled by said cam apparatus. The control apparatus is capable of grinding reliably a work to be ground to a preset thickness, and the finishing thickness of the work to be ground can be altered with ease.

5 Claims, 5 Drawing Sheets

| AMMETER | SWITCH | MOTOR 44 |
|---|---|---|
| MAX CONTACT POINT <u>ON</u> | <u>OFF</u> | <u>STOP</u> |

| AMMETER | SWITCH | MOTOR 44 |
|---|---|---|
| MAX. CONTACT POINT <u>ON</u> MAINTAINS THIS CONNECTION | OFF | STOP |

| AMMETER | SWITCH | MOTOR 44 |
|---|---|---|
| MIN. CONTACT POINT <u>ON</u> | <u>ON</u> | <u>RUN</u> |

| AMMETER | SWITCH | MOTOR 44 |
|---|---|---|
| MIN. CONTACT POINT <u>OFF</u> | <u>ON</u> | <u>RUN</u> |

CONTROL APPARATUS FOR GRINDING MACHINE

FIELD AND BACKGROUND OF THE INVENTION

The present invention relates to a control apparatus for controlling the amount of grinding (by controlling the amount of feed) of a belt material in a grinding machine. For example, in the process of making belts, a vulcanized and molded cylindrical belt material (also referred to as slab) is ground on its outer or back side, prior to being cut into belts of a desired belt width, to finish the belt material thickness to a standard dimension.

A conventional apparatus of the following configuration has been normally used for controlling the amount of grinding when the belt material is ground to a specified thickness by a grinding machine.

As shown in FIG. 7, a base 2' on which a grinding machine 3' having a grinding belt 7' is mounted is slidably arranged on a head 12'. A driving motor 70 is mounted on one end of the base 2'. A ball screw rod or feed screw rod 72 connected to the driving shaft of the driving motor 70 by a coupling 71 is screwed into an internally threaded member 73 fixed onto the under surface of the head 12'. The screw rod 72 is turned to force the grinding machine 3' into contact with a belt material A mounted on a main shaft roll 21' held in a fixed position on the base 2' and a tension roll 26' to grind the belt material A by means of the revolving grinding belt 7'. When the amount of feed of the grinding belt 7' relative to the base 2' and the belt material A reaches a preset value, the driving motor 70 is stopped to terminate the grinding operation.

There is also a grinding amount control apparatus that uses a hydraulic cylinder in place of the driving motor and screw rod for moving the grinding machine, and a manually operated apparatus that uses no control apparatus for moving the grinding machine.

Of the above-mentioned conventional grinding amount control devices, in the case of the controlling apparatus using the driving motor 70 (FIG. 7), to raise the control accuracy, it is necessary to use an expensive driving motor 70 such as a servomotor or a pulse motor; thus the production cost increases. Moreover, when the so-called load control is made, wherein when the load resistance working on the grinding belt 7' increases during the grinding operation of a belt material A, the rotation of the driving motor 70 will be stopped for awhile to interrupt the feed of the grinding belt 7' towards the belt material A, the driving motor 70 tends to be affected by disturbances such as noise, possibly making the load control unreliable.

In the case of the control apparatus using a hydraulic cylinder as the apparatus for moving the grinding machine, the control tends to be unstable since a change in the oil temperature is accompanied with a change in the accuracy of control of the grinding amount. Moreover, because of the nature of the mechanism, delicate control of the grinding amount by means of a hydraulic cylinder is difficult.

In the case of the control apparatus by manual operation, an operator must attend the apparatus throughout its operation. Hence its working efficiency is very low and the workload of the operator is excessive.

SUMMARY OF THE INVENTION

The present invention has the purpose of avoiding the aforementioned problems, and has as its object to provide a grinding amount control apparatus for a grinding machine, the control apparatus being characterized in that the production cost is lower in comparison with the conventional apparatus using a driving motor for electric control, the apparatus is not affected by electrical disturbances and has a high accuracy, and the apparatus allows easy adjustment in the final thickness of the work.

To accomplish the aforementioned objectives, the grinding amount control apparatus according to the present invention comprises at least one grinding member such as a grinding wheel or a grinding belt and the workpiece to be ground, such as a belt material, is rotated. Either one is held in a fixed position and the other is forced into contact with the former. The latter is fed further to grind the workpiece to the desired thickness, by means comprising a) a feed apparatus for feeding either the grinding member or the workpiece to force it into contact with the other, b) a cam apparatus for regulating the feed stepwise up to the preset maximum feed position, and c) a thickness presetting means for presetting the final thickness of the workpiece in the maximum feed position of the grinding member controlled by the cam apparatus.

When a workpiece, for example, a belt material is to be ground to a certain thickness by the grinding amount control apparatus, according to the present invention having the aforementioned configuration, the belt material is rotated in a fixed position, and the grinding member, turning or not turning, is brought close to the belt material by the feed apparatus. When the grinding member comes close to or contacts the belt material within a specified range, the cam apparatus will regulate the feed of the grinding member. In this way, the grinding member is gradually (stepwise) fed relative to the belt material up to the maximum feed position under the regulation of the cam apparatus. The belt material is eventually ground to the preset thickness. Therefore, the control of the maximum grinding amount of the belt material effected by the grinding member is determined by the cam shape (step) of the cam apparatus. Hence the accuracy of the maximum grinding amount of the belt material given by the grinding member is not affected at all even when the driving motor for rotating the cam apparatus (in case of a rotary type) is affected by some disturbances. Thus the belt material is always ground to the constant preset thickness.

When it is desired to change the final thickness of the ground belt material, the final finishing thickness of the ground belt material can be changed by inserting a thickness setting device such as a plate, for instance, at the point of contact with the cam apparatus, or replacing an existing thickness setting mechanism with another one to regulate the grinding amount.

In contrast with the aforementioned embodiment, when the belt material is forced to contact the grinding member which is held in a fixed position, an effect similar to the aforementioned embodiment is obtained.

DETAILED DESCRIPTION OF THE INVENTION

Figure 4:
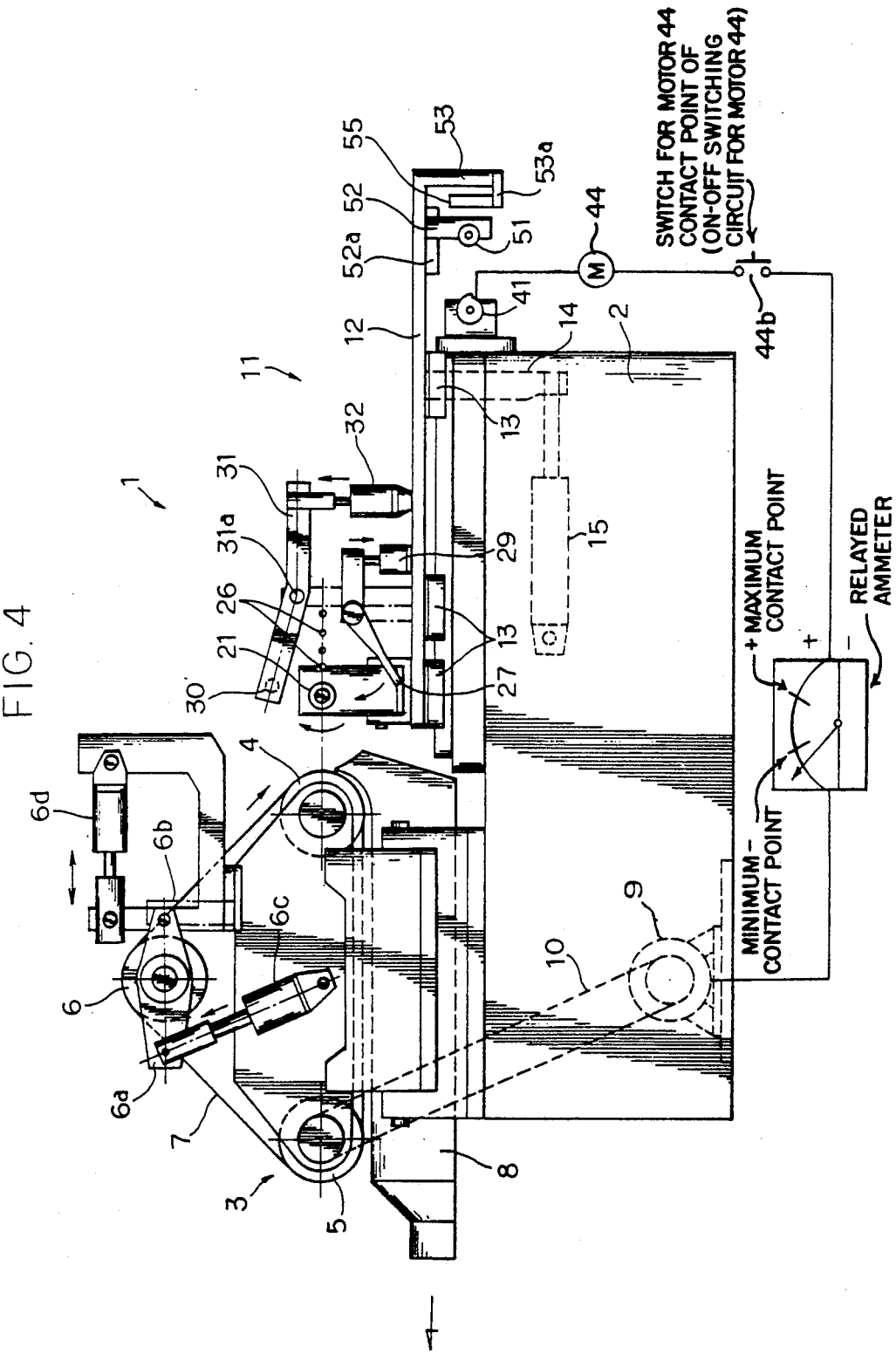
FIG. 4 is a general schematic front view of a belt material grinding machine equipped with a grinding amount control apparatus according to a preferred embodiment of the present invention.
Figure 5:
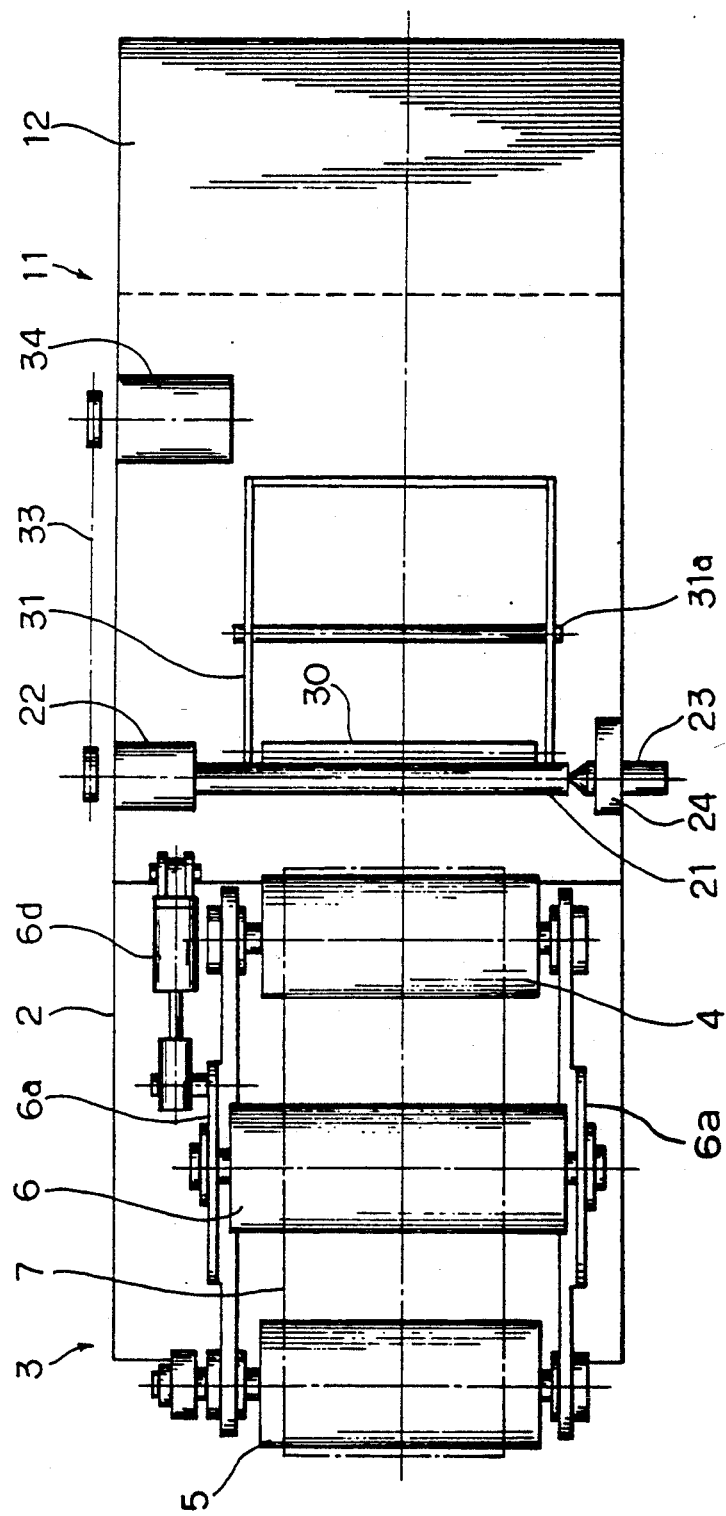
FIG. 5 is a plan view of the grinding machine of FIG. 4.

With reference to the attached drawings, first, the configuration of the grinding machine as a whole is described. As shown in FIGS. 4 and 5, a belt grinder 3 is arranged on the bed 2 of a grinding machine 1 on one side thereof (toward the left-hand side of the figures). The belt grinder 3 per se is of well-known prior art construction. An abrasive cloth/paper belt 7 (also referred to as sanding paper) is placed over a contact wheel 4 which is arranged near the center of the bed 2, a driving wheel 5 being arranged on one side of the bed 2, and a tension wheel 6 being arranged above a center point between the wheel 4 and the wheel 5. The contact wheel 4 and the driving wheel 5 are set at substantially the same elevation. Below both wheels 4 and 5 is provided a dust collector 8. A suction device (not illustrated) connected to one end of the dust collector 8 is arranged to suck and collect the grinding dust generated during a grinding operation. The driving wheel 5 is connected to be rotated by a driving motor 9 installed in the lower end of the bed 2 through a driving belt 10. The tension wheel 6 is rotatably suspended between a pair of brackets 6a. The brackets 6a are pivotally held by a support member 6b on one end thereof, and the other ends are connected to a tension cylinder 6c. The abrasive cloth/paper belt 7 is thus arranged to be tensioned by extending the piston rod of the tension cylinder 6c. Furthermore, a tracking cylinder 6d is connected to one end of one of the brackets 6a. The extension or contraction movement of the tracking cylinder 6d sways one end of tension wheel 6 to adequately meander the abrasive cloth/paper belt 7. Meandering of the abrasive cloth/paper belt 7 during grinding extends the life of the belt 7 and also improves the finish of a belt material A (FIG. 6) to be ground, which will be explained later.

On the other side (the right-hand side of FIG. 4) of the bed 2, a rotary support means 11 for the belt material A is provided. The rotary support means 11 is arranged as follows.

A base 12 is arranged on the bed 2 with linear bearings 13 so that the base 12 can be moved horizontally. One end of a hydraulic cylinder 15, which is a feed apparatus in the present embodiment, is coupled to the lower end of a support piece 14 extending downwardly from the base 12. The other end of the cylinder 15 is coupled to the bed 2 by conventional means (not shown). The base 12 is arranged to move towards or away from the belt grinder 3 according to the extension or contraction of the hydraulic cylinder 15.

A work roll 21 (see FIG. 5) is arranged in one end (towards the center of the bed 2) of the movable base 12 to oppose the contact wheel 4 of the belt grinder 3, with the axis of the work roll 21 being at substantially the same elevation as that of the wheel 4. One end of the work roll 21 is rotatably held, by means of bearings (not illustrated), by a support member 22 erected on one side of the base 12, and the other end of the work roll 21 is rotatably held by a rotation center 23. The rotation center 23 is mounted on a tail spindle 24 swingably supported by a support member (not illustrated), and the rotation center 23 is arranged to be removable from the end of the work roll 21 when a belt material A is to be mounted on the work roll 21 or removed from it.

A plurality of idler shafts 26, the outer diameters of which are considerably smaller than that of the work roll 21, are rotatably mounted at specified intervals on the base 12 by means of conventional support members (not illustrated). Although not illustrated, the support member of one end of the idler shaft 26 is arranged to be removable from the idler shaft 26 when a belt material A is to be mounted or removed.

Figure 6:
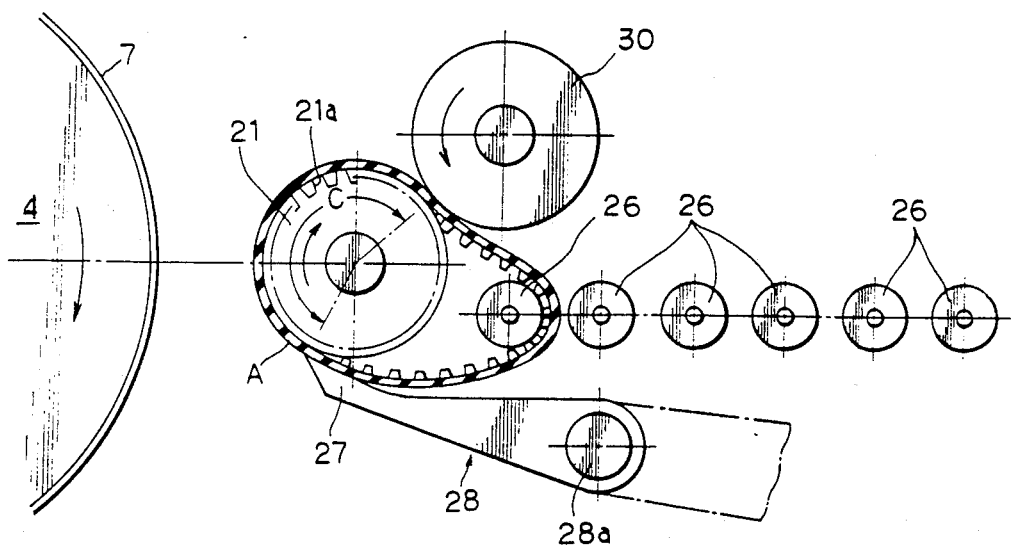
FIG. 6 is an enlarged front view of the machine of FIG. 4, showing the portion of the machine around the work roll.
Figure 7:
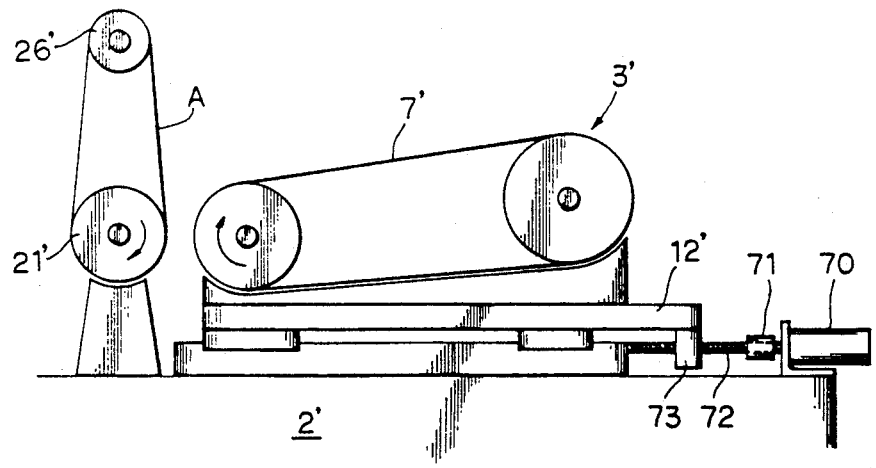
FIG. 7 is a schematic front view of a conventional grinding amount control apparatus for a grinding machine.

As shown in FIG. 6, a molded and vulcanized cylindrical belt material A is placed between the work roll 21 and an idler shaft 26. In the present embodiment, the belt material A to be ground is the belt material of the smallest currently produced diameter (presently 29 mm) for small-sized toothed belts. Hence tooth spaces 21a corresponding to the teeth of the small-sized toothed belt material A are formed in the circumferential surface of the work roll 21. A frame-shaped lever 28 is pivotally held by a pivot shaft 28a so that it can be freely moved in the vertical direction. A conforming plate 27 as sliding member is attached to the outer end of the lever 28, the conforming plate 27 having an arcuate shape to conform to the small-sized toothed belt material A on the work roll 21. The frame-shaped lever 28 is actuated upwardly by a pneumatic cylinder 29 (FIG. 4) which forms an actuating means to press the conforming plate 27 against the outer surface of the small-sized toothed belt material A at a lower part (on the opposite side of the rotation direction relative to the contact part with the abrasive cloth/paper belt 7) of the work roll 21. Furthermore, above the frame-shaped lever 28, a frame-shaped lever 31 (FIG. 4 and FIG. 5), having a rotatable squeezing or pressure roll 30 mounted on its outer end, is pivotally supported by a pivot shaft 31a so that the ends of the lever 31 can be freely rotated in the vertical direction. The right-hand end of the lever 31 is actuated vertically by a pneumatic cylinder 32 (FIG. 4) which forms an actuating means to press the squeezing or pressure roll 30 against the small-sized toothed belt material A at an upper part (on the rotation side relative to the contact part with the abrasive cloth/paper belt 7) of the work roll 21. The work roll 21 is rotated, as shown in FIG. 5, by a driving motor 34, through a driving belt 33. The direction of rotation of the work roll 21 is clockwise, and the direction of the rotation of the abrasive cloth/paper belt 7 of the belt grinder 3 is arranged to be reverse to that of the belt material A at the contact area between them, as shown by the arrows in FIG. 6. As shown in FIG. 6, when the work roll 21 is rotated, the small-sized toothed belt material A will be rotated in the clockwise direction. At the same time, the conforming plate 27 is pressed against the belt material A at a lower part of the work roll 21 to control the rotation of the belt material A. At the same time, the squeezing or pressure roll 30 is pressed against the belt material A at an upper part of the work roll 21, and the belt material A is thus squeezed along the contacting circumference of the work roll 21. Hence there is a little slack on the side toward the rollers 26 but not along the portion C contacting the work roll 21 as shown in FIG. 6, and this condition is close to that encountered during the service of the belts (the final products).

In FIG. 4, the hydraulic cylinder 15 is contracted to move the base 12 towards the belt grinder 3. The belt material A will contact, under the condition of FIG. 6 described above, against the abrasive cloth/paper belt 7 on the contact wheel 4, and the grinding of its back surface will be started. In the case of a small-sized toothed belt, the amount of grinding on the back surface of the belt material A is normally very small, about 1 mm. The amount of grinding of the belt material A, therefore, is adjusted by means of the grinding amount controlling apparatus according to the present invention.

In the following, the embodiment of the grinding amount control apparatus 40 according to the present invention is described in detail.

Figure 1:
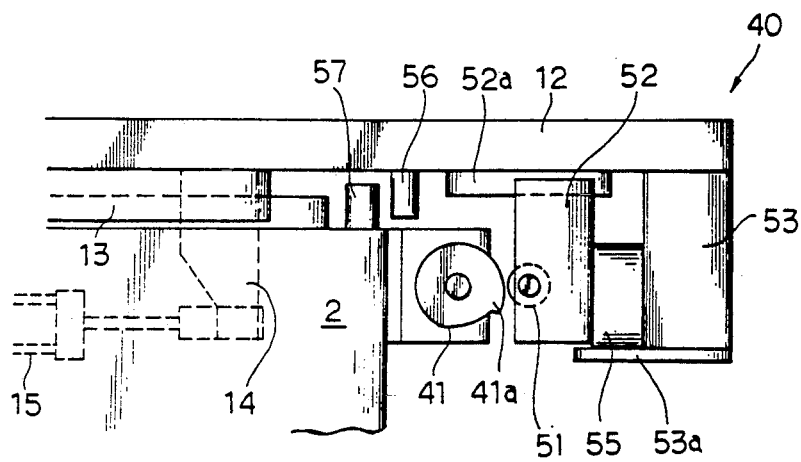
FIG. 1 is a fragmentary front view of an embodiment of the grinding amount control apparatus according to the present invention.
Figure 2:
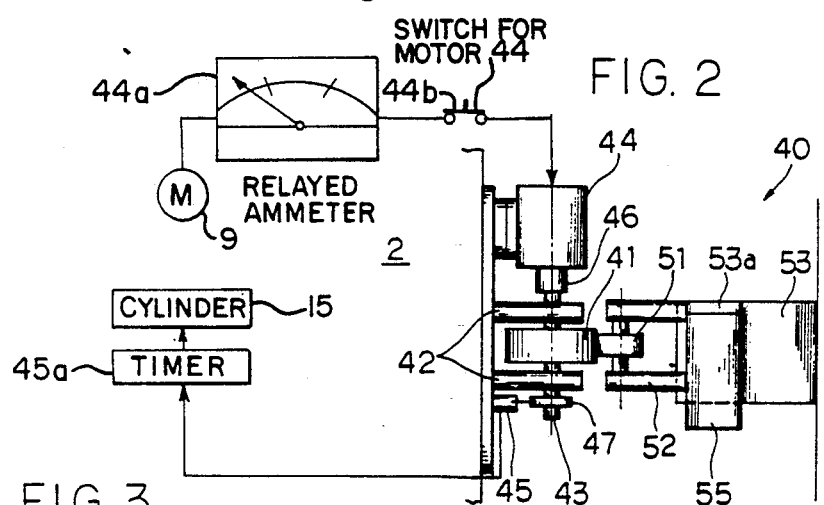
FIG. 2 is a partial plan view of the apparatus of FIG. 1.

As shown in FIGS. 1 and 2, on the rear end of the bed 2, a pair of laterally bearing support members 42 are provided and project rearwardly with a certain interval in between. A nearly circular cam plate 41 (also see FIG. 4) is supported on a rotary shaft 43 between the bearing members 42 so that the cam plate 41 can be freely rotated by the rotary shaft 43. One end (root end) of the rotary shaft 43 is connected, with a coupling 46, to the driving shaft of a low-speed drive motor 44 (FIGS. 2 and 4) mounted on the rear end of the bed 2 so that the shaft 43 can rotate integrally with the driving shaft of the driving motor 44. The cam plate 41 is provided with a cam lobe or projection 41a which is set for the maximum amount of grinding (maximum feed) of the belt material A, i.e. the maximum gap (the difference between the minimum diameter and the maximum diameter of the cam plate 41). In the present embodiment, the gap is set at 1 mm. The low-speed driving motor 44 is provided with a control circuit for driving the motor 44 under so-called load control wherein the motor 44 stops rotation when the current of the driving motor 9 of the belt grinder 3 exceeds a preset current, and the motor 44 starts to turn when the current drops to or below the preset current. With reference to FIGS. 2 and 4, a load current responsive device 44a (such as a relayed ammeter) controls an on-off switch 44b which controls the power to the motor 44.

On the other end (top end) of the driving shaft 43, a switch controlling (auxiliary) cam plate 47 is mounted. The cam plate 47 is designed to stop the rotation of the cam plate 41 when the cam plate 41 rotates to the maximum feed position, and then to restore the cam plate 41 to the rotation starting position (origin). A limit switch 45 which contacts with the controlling cam plate 47 is fixed to the rear end of the bed 2. As shown in FIG. 2, the switch 45 is connected to actuate a timer 45a which in turn controls the actuation of the cylinder 15.

On the other hand, on the lower surface of the base 12 at its rear end, a guide member 52a (FIGS. 1 and 4) is mounted in the longitudinal direction thereof. A pair of supports 52 are slidably suspended along the guide member 52a. A roller bearing 51, which is the cam follower of the cam plate 41, is rotatably arranged between the two supports 52. On the lower surface of the base 12 at its rear end, a plate mounting member 53 extends downwardly. On the lower end of the plate mounting member 53, is mounted a plate support 53a which extends towards the front (head) so that a thickness setting plate 55 (means for setting the thickness of the belt material A) can be placed on the plate support 53a. The thickness setting plate 55 is a plate for presetting the final thickness of the belt material A after grinding. Numerals 56 and 57 of FIG. 1 indicate stopper members for controlling the most forward position of the base 12 on the head 2.

Next, the use and operation of the grinding machine of the aforementioned embodiment are explained. Reference is made to FIGS. 1, 2 or 4.

(1) A belt material (FIG. 6) to be ground is placed between the work roll 21 and one of the idler shafts 26.

(2) A belt thickness setting plate 55 is placed on the plate support 53a of the plate mounting member 53.

(3) The abrasive cloth/paper belt 7 of the belt grinder 3 is rotated clockwise by the driving motor 9.

(4) The suction device of the dust collector 8 is driven to collect the grinding dust.

(5) The work roll 21 is rotated by the driving motor 34 to rotate the belt material A clockwise.

(6) The pneumatic cylinder 32 is extended to press the squeezing or pressure roll 30 against the belt material A on the work roll 21, then the pneumatic cylinder is contracted to press the conforming plate 27 against the belt material A.

(7) The hydraulic cylinder 15 is retracted to gradually bring the rotary support means 11 towards the belt grinder 3.

Figure 8A:
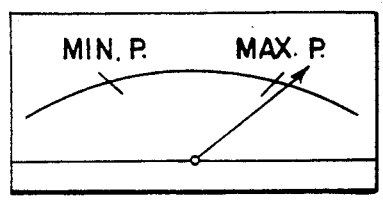
FIGS. 8a, 8b, 8c and 8d are diagrams which illustrate the operation of the invention.
Figure 8B:
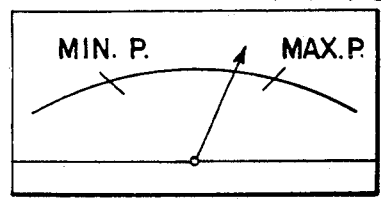
Figure 8C:
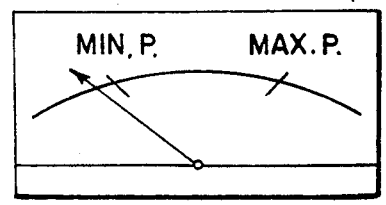
Figure 8D:
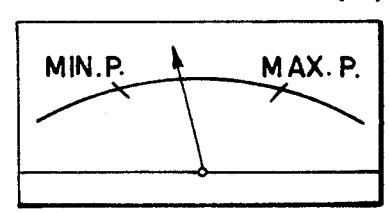

(8) When the hydraulic cylinder 15 is retracted, the base 12 slides forwardly on the head 2, the supports 52 are pushed forwardly by the base 12, through the plate mounting member 53 and the thickness setting plate 55, and the roller bearing 51 contacts the projection or lobe 41a of the cam plate 41. At the same time, the cam plate 41 will start to be rotated clockwise by the slow-speed driving motor 44. Under this condition, the back surface of the belt material A on the work roll 21 is in contact with the abrasive cloth/paper belt 7 on the contact wheel 4, and the grinding work will be started. In this manner, the amount of grinding of the belt material A (on the work roll 21) effected by the abrasive cloth/paper belt 7 (on the contact wheel 4) is controlled by the cam plate 41, and when the cam plate 41 is rotated clockwise as seen in FIG. 1, the abrasive cloth/paper belt 7 will be gradually pressed forwardly against the belt material A, and thus the grinding work will be accomplished. As explained above, when the workload resistance on the abrasive cloth/paper belt 7 increases and the current drawn by the drive motor 9 (sensed by the device 44a) of the belt grinder 3 exceeds a preset value, the rotation of the cam plate 41 will be stopped by opening the switch 44b. Conversely, when the load resistance decreases and the current drops to or below the preset value, the switch 44b is closed and the cam plate 41 will be rotated, and thus stepwise automatic control will be made. This operation is illustrated in FIGS. 8a to 8d. FIGS. 8a and 8b show the process when turning down from a maximum point to a minimum point, whereas FIGS. 8c and 8d show the process when moving up from the minimum point to the maximum point.

(9) When the cam plate 41 makes nearly one rotation and the minimum diameter position of the cam plate 41 comes to the roller bearing 51, the feed of the abrasive cloth/paper belt 7 relative to the belt material A will be the largest, and the belt material A will be ground to the preset thickness. At the same time, the limit switch 45 will be operated by the auxiliary cam plate 47 to stop the driving motor 44, and the cam plate 41 will stop rotation.

(10) Under control of the timer 45a, the grinding of the belt material A is continued for several seconds after reaching the state of (9) above. Then the hydraulic cylinder 15 is quickly extended to restore the rotary support means 11 away from the belt grinder 3 to the original position.

(11) The pneumatic cylinder 32 is retracted and the pneumatic cylinder 29 is extended to separate the squeezing or pressure roll 30 and the conforming plate 27 away from the belt material A on the work roll 21, respectively. Then the rotation of the belt material A is terminated. At the same time, the rotation of the abrasive cloth/paper belt 7 of the belt grinder 3 is terminated. The operation of the suction device of the dust collector 8 is also terminated. Furthermore, the cam plate 41 is rotated to restore it to the original or initial position for start of rotation. The original position of the cam plate 41 is detected by the auxiliary cam plate 47 and the limit switch 45 which contacts with the cam plate 47.

(12) Lastly, the ground belt material A is removed from the work roll 21 and the idler shaft 26 to complete the grinding operation.

Figure 3:
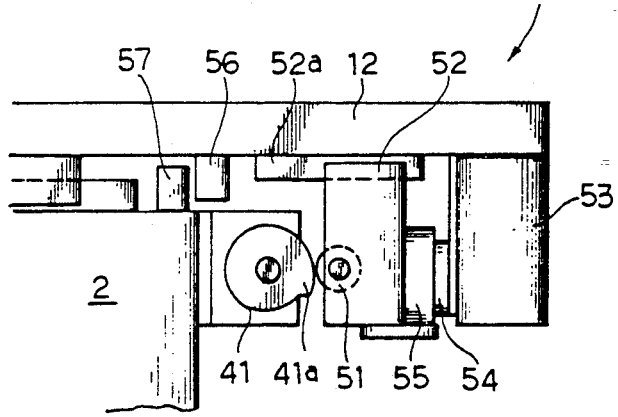
FIG. 3 is a front view of another embodiment of the grinding amount control apparatus according to the present invention.

In the above-mentioned embodiment, the thickness setting plate 55 is mounted on the plate mounting member 53. However, as shown in FIG. 3, the thickness setting plate 55 may be removably mounted on the supports 52, and at the same time, a correcting plate 54 may be mounted on the plate mounting member 53. Moreover, the above-mentioned embodiment, the base 12 is arranged to move forwardly when the hydraulic cylinder 15 is retracted. In contrast, the base 12 may be arranged to move forwardly when the hydraulic cylinder 15 is extended. In place of the belt grinder 3, a grinder of a wheel type may be used. Further, in contrast with the above-mentioned embodiment, the work to be ground, such as a belt material A, may be held in a constant position, and the grinder may be moved close to or away from the work to be ground. Furthermore, the work to be ground is not limited to a belt material A. The present invention may be used for grinding molds and gears.

As will be clear from the explanation above, the present invention has the following advantages or effects:

In comparison with conventional apparatus which use a driving motor to effect electrical control, the apparatus according to the present invention has a simple construction and comprises relatively inexpensive components, requiring a smaller production cost. Since the control of the amount of grinding (feed) is effected by a cam device, the apparatus according to the present invention is not easily influenced by electrical disturbances. Thus the apparatus of the present invention can give stable control of high precision and grind a work to be ground to a preset thickness. Furthermore, as the thickness of a work to be ground can be set by a thickness setting means, the finished (final) thickness of the work to be ground can be altered with ease.

What is claimed is:

1. A grinding amount control apparatus for a grinding machine including at least one grinding member for grinding a work member to be ground, and means for holding one of said members in a constant position during said grinding, said control apparatus comprising:
a feed apparatus connected to the other of said members for feeding said other of said members into grinding contact with said one of said members,
a thickness presetting means connected to said feed apparatus for bringing said one of said members to a preset feed position whereby said work member is ground to a preset thickness determined by the thickness of said presetting means, and
a movable cam apparatus connected to said feed apparatus for regulating the feed from said preset feed position through a fixed distance to a final feed position whereby said work member is ground to a final thickness determined by the thickness of said presetting means and by the movement of said cam apparatus.

2. A grinding amount control apparatus as set forth in claim 1, wherein said thickness presetting means comprises at least one thickness setting plate.

3. A grinding amount control apparatus as set forth in claim 1, wherein said cam apparatus comprises a rotatable cam having a varying radius.

4. A grinding amount control apparatus as set forth in claim 1, and further including timing means for continuing grinding for a predetermined time in said final feed position.

5. A grinding amount control apparatus as set forth in claim 1, wherein said feed apparatus comprises a hydraulic mechanism.

* * * * *